N. DOWNES.
Water Cooler.
No. 56,193.
Patented July 10, 1866.
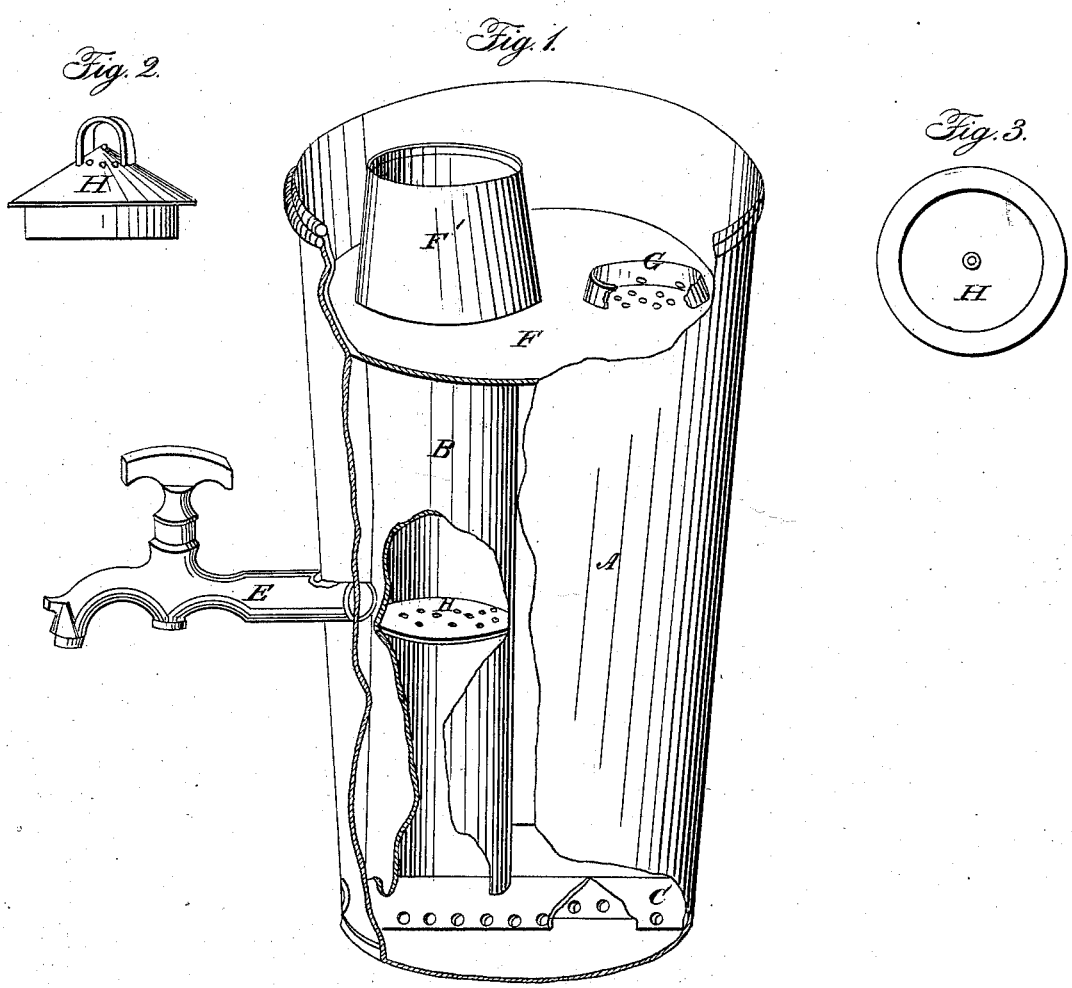
Witnesses:
Inventor:

UNITED STATES PATENT OFFICE.

NICHOLAS DOWNES, OF SYRACUSE, NEW YORK.

IMPROVEMENT IN FILTERS.

Specification forming part of Letters Patent No. 56,193, dated July 10, 1866.

*To all whom it may concern:*

Be it known that I, NICHOLAS DOWNES, of Syracuse, in the county of Onondaga and State of New York, have invented a new and useful Improvement in Water Filters and Coolers; and I do hereby declare that the following is a full, clear, and exact description of the same, reference being had to the annexed drawings, made part of this specification, in which—

Figure 1 is a perspective view, in which parts are represented as broken away to show the structure of other parts; and Figs. 2 and 3 are detached views of the cover of the reservoir.

My improvements relate to my former invention, as set forth in Patent No. 46,646, issued February 27, 1865.

A represents the body of the filter, to be made of any required capacity. B is a cylindrical reservoir, inclosed in the body of the filter and cooler and open above and below. This reservoir rests upon the tube for cleansing C, which extends across the bottom of A, and is perforated with holes, through which the water may be drawn when desired, the tube being closed on the outside by a plug or faucet, as desired. Across the reservoir B, I place the perforated disk D, for the purpose of preventing the filtering materials from floating to the top of the reservoir. This disk I place immediately below the faucet E, through which the pure water is drawn from the reservoir above the perforated disk. The reservoir is packed with the filtering material up to the disk D. The reservoir extends a little above the body A of the filter, and is closed by the perforated cover H.

F is the cover, made as represented in the drawings. Into this the unfiltered water may be poured, which passes through the perforations within the flange G into the body of the filter. This cover is so constructed that a part of it, formed as a collar, represented by F', shall extend to the top of the reservoir, and, leaving a dead-air space around the reservoir, (it being fitted closely to the top of the reservoir,) form an excellent water-cooler.

Having fully explained the construction of my improved water filter and cooler, what I claim as my invention, and seek to secure by Letters Patent, is—

The combination of the cover F, having the collar F', the reservoir B, and cleansing-tube C, and with or without the perforated disk D, when severally constructed and arranged for use substantially in the manner and for the purpose set forth.

In testimony whereof I have signed my name to this specification in the presence of two subscribing witnesses.

NICHOLAS DOWNES.

Witnesses:
J. HUNT,
G. H. BOOTH.